US00RE47644E

(19) United States
(12) Reissued Patent
Peron

(10) Patent Number: US RE47,644 E
(45) Date of Reissued Patent: Oct. 15, 2019

(54) MEDICAL DRESSING

(71) Applicant: Smith & Nephew PLC, Watford (GB)

(72) Inventor: Yannick Louis Peron, East Yorkshire (GB)

(73) Assignee: Smith & Nephew PLC, Watford (GB)

(21) Appl. No.: 29/608,688

(22) Filed: Jun. 23, 2017

Related U.S. Patent Documents

Reissue of:
(64) Patent No.: Des. 679,819
Issued: Apr. 9, 2013
Appl. No.: 29/389,782
Filed: Apr. 15, 2011

U.S. Applications:
(60) Continuation of application No. 29/551,890, filed on Jan. 18, 2016, now abandoned, which is a division of application No. 29/510,714, filed on Dec. 2, 2014, now Pat. No. Re. 45,864, which is an application for the reissue of Pat. No. Des. 679,819.

(51) LOC (12) Cl. ..... 24-04
(52) U.S. Cl.
USPC ..... D24/184
(58) Field of Classification Search
USPC ..... D24/189
CPC ..... A61F 13/02; A61M 1/009; A61M 27/00; A61M 1/0088
See application file for complete search history.

(56) References Cited

U.S. PATENT DOCUMENTS 2,613,696 A * 10/1952 MacIntyre ..... 139/418
3,342,183 A * 9/1967 Edenbaum ..... 604/307
3,568,675 A 3/1971 Harvey
D267,510 S * 1/1983 Golub ..... D24/189
4,564,010 A * 1/1986 Coughlan et al. ..... 604/307
4,587,146 A * 5/1986 Anhauser et al. ..... 428/42.2
4,627,429 A * 12/1986 Tsuk ..... 604/307
D292,826 S * 11/1987 Sproles ..... D24/189
4,808,172 A * 2/1989 Murata ..... 604/306
4,917,112 A * 4/1990 Kalt ..... A61F 13/023 128/888
5,052,381 A * 10/1991 Gilbert et al. ..... 602/52
5,056,510 A * 10/1991 Gilman ..... 602/52
5,266,371 A * 11/1993 Sugii et al. ..... 428/41.5
D352,782 S * 11/1994 Kirk et al. ..... D24/189
D357,742 S * 4/1995 Peery et al. ..... D24/189
5,437,651 A 8/1995 Todd et al.
D362,505 S * 9/1995 Fabricant ..... D24/189
D369,907 S * 5/1996 Sayovitz et al. ..... D5/53
D370,127 S * 5/1996 Bonaddio et al. ..... D5/58
D372,098 S * 7/1996 Lattin et al. ..... D24/189
5,549,584 A 8/1996 Gross
5,636,643 A 6/1997 Argenta et al.
5,645,081 A 7/1997 Argenta et al.
D382,343 S * 8/1997 Wandell et al. ..... D24/189
D384,745 S * 10/1997 Lattin et al. ..... D24/189
D385,038 S * 10/1997 Shultz ..... D24/189
D389,581 S * 1/1998 Fein ..... D24/189
5,998,694 A * 12/1999 Jensen et al. ..... 602/57
6,011,194 A 1/2000 Buglino et al.
D424,699 S * 5/2000 Allen ..... D24/189
6,071,267 A 6/2000 Zamierowski
6,142,982 A 11/2000 Hunt et al.
6,345,623 B1 2/2002 Heaton et al.
D477,086 S * 7/2003 Tsuruda et al. ..... D24/189
6,648,862 B2 11/2003 Watson
6,685,681 B2 2/2004 Lockwood et al.
6,752,794 B2 6/2004 Risk et al.
D495,056 S * 8/2004 Watanabe ..... D24/189
6,936,037 B2 8/2005 Bubb et al.
D509,299 S * 9/2005 Watanabe ..... D24/189
6,951,553 B2 10/2005 Bubb et al.
7,004,915 B2 2/2006 Boynton et al.
7,108,683 B2 9/2006 Zamierowski
7,195,624 B2 3/2007 Lockwood et al.
D571,922 S * 6/2008 Freeland ..... D24/189
7,381,859 B2 6/2008 Hunt et al.
D572,367 S * 7/2008 Freeland ..... D24/189
D572,824 S * 7/2008 Propp ..... D24/189
D572,825 S * 7/2008 Freeland ..... D24/189
7,438,705 B2 10/2008 Karpowicz et al.
7,569,742 B2 8/2009 Haggstrom et al.
D600,354 S * 9/2009 Sachi ..... D24/189
D604,424 S * 11/2009 Coubetergues ..... D24/189
7,615,036 B2 11/2009 Joshi et al.
D605,299 S * 12/2009 Iwahashi et al. ..... D24/189
7,645,269 B2 1/2010 Zamierowski
D609,922 S * 2/2010 Bridges et al. ..... D5/53
7,722,582 B2 5/2010 Lina et al.
D618,810 S * 6/2010 Tanigawa et al. ..... D24/189
D620,122 S * 7/2010 Cotton ..... D24/189

| | | | | |
|---|---|---|---|---|
| D620,123 | S * | 7/2010 | Igwebuike | D24/189 |
| 7,759,537 | B2 | 7/2010 | Bishop et al. | |
| 7,759,539 | B2 | 7/2010 | Shaw et al. | |
| 7,776,028 | B2 | 8/2010 | Miller et al. | |
| 7,779,625 | B2 | 8/2010 | Joshi et al. | |
| 7,794,438 | B2 | 9/2010 | Henley et al. | |
| D625,017 | S * | 10/2010 | Iwahashi et al. | D24/189 |
| D625,018 | S * | 10/2010 | Smith et al. | D24/189 |
| D631,166 | S * | 1/2011 | Leffew et al. | D24/189 |
| 7,959,624 | B2 | 6/2011 | Riesinger | |
| 7,964,766 | B2 | 6/2011 | Blott et al. | |
| 7,976,519 | B2 | 7/2011 | Bubb et al. | |
| 8,080,702 | B2 | 12/2011 | Blott et al. | |
| 8,152,785 | B2 | 4/2012 | Vitaris | |
| 8,361,043 | B2 * | 1/2013 | Hu | A61F 5/4401 604/319 |
| D679,819 | S * | 4/2013 | Peron | D24/189 |
| D679,820 | S * | 4/2013 | Peron | D24/189 |
| 8,540,699 | B2 | 9/2013 | Miller et al. | |
| D705,428 | S * | 5/2014 | Cheney | D24/169 |
| D705,429 | S * | 5/2014 | Cheney | D24/169 |
| 8,715,256 | B2 | 5/2014 | Greener | |
| 8,764,732 | B2 | 7/2014 | Hartwell | |
| 8,801,685 | B2 | 8/2014 | Armstrong et al. | |
| 8,808,274 | B2 | 8/2014 | Hartwell | |
| D713,967 | S * | 9/2014 | Adoni | D24/189 |
| 8,905,985 | B2 | 12/2014 | Allen et al. | |
| 8,951,235 | B2 | 2/2015 | Allen et al. | |
| 9,061,095 | B2 | 6/2015 | Adie et al. | |
| RE45,864 | E | 1/2016 | Peron | |
| RE46,289 | E | 1/2017 | Peron | |
| 2006/0009744 | A1 | 1/2006 | Erdman et al. | |
| 2008/0167593 | A1 | 7/2008 | Fleischmann | |
| 2009/0227969 | A1 | 9/2009 | Jaeb et al. | |
| 2009/0240185 | A1 | 9/2009 | Jaeb et al. | |
| 2009/0281471 | A1 * | 11/2009 | Iwahashi et al. | 602/54 |
| 2009/0293887 | A1 | 12/2009 | Wilkes et al. | |
| 2009/0299340 | A1 | 12/2009 | Kazala et al. | |
| 2009/0299341 | A1 | 12/2009 | Kazala et al. | |
| 2009/0312728 | A1 | 12/2009 | Randolph et al. | |
| 2010/0069858 | A1 | 3/2010 | Olson | |
| 2010/0069863 | A1 | 3/2010 | Olson | |
| 2010/0069885 | A1 | 3/2010 | Stevenson et al. | |
| 2010/0121286 | A1 | 5/2010 | Locke et al. | |
| 2010/0122417 | A1 | 5/2010 | Vrzalik et al. | |
| 2010/0125258 | A1 | 5/2010 | Coulthard et al. | |
| 2010/0305490 | A1 | 12/2010 | Coulthard et al. | |
| 2010/0305526 | A1 | 12/2010 | Robinson et al. | |
| 2010/0305549 | A1 | 12/2010 | Miller et al. | |
| 2010/0324510 | A1 | 12/2010 | Anderson et al. | |
| 2011/0028918 | A1 | 2/2011 | Hartwell | |
| 2011/0054421 | A1 | 3/2011 | Hartwell | |
| 2011/0054423 | A1 | 3/2011 | Blott et al. | |
| 2011/0087179 | A2 | 4/2011 | Blott et al. | |
| 2011/0092927 | A1 | 4/2011 | Wilkes et al. | |
| 2011/0106030 | A1 | 5/2011 | Scholz | |
| 2011/0112492 | A1 | 5/2011 | Bharti et al. | |
| 2011/0172615 | A2 | 7/2011 | Greener | |
| 2014/0343520 | A1 | 11/2014 | Bennett et al. | |

FOREIGN PATENT DOCUMENTS

| | | | |
|---|---|---|---|
| EP | 0 619 105 | A1 | 10/1994 |
| EP | 2 098 257 | A1 | 9/2009 |
| EP | 2 335 749 | A1 | 6/2011 |
| WO | WO 99/001173 | | 1/1999 |
| WO | WO 99/01173 | A1 | 1/1999 |
| WO | WO 01/85248 | | 11/2001 |
| WO | WO 01/85248 | A1 | 11/2001 |
| WO | WO 10/033574 | | 3/2010 |
| WO | WO 2010/033574 | A1 | 3/2010 |
| WO | WO 10/147533 | | 12/2010 |
| WO | WO 2010/147533 | A1 | 12/2010 |
| WO | WO 11/019476 | | 2/2011 |
| WO | WO 2011/019476 | A1 | 2/2011 |
| WO | WO 11/023275 | | 3/2011 |
| WO | WO 2011/023275 | A1 | 3/2011 |

OTHER PUBLICATIONS

Allevyn Educational Booklet, Smith & Nephew Medical Ltd, Apr. 2014.
Allevyn Wound Dressings Pamphlet, Smith & Nephew, Inc., 2008.
KCI Licensing, Prevena™ Incision Management System, Jan. 2010.
Teder et al., "Continuous Wound Irrigation in the Pig," Journal of Investigative Surgery, vol. 3, 1990, pp. 399-407.
U.S. Appl. No. 29/389,783, filed Apr. 15, 2011, Peron.
U.S. Appl. No. 13/092,042, filed Apr. 21, 2011.
KCI Licensing, Prevena™ Incision Management System Patient Guide, Jan. 2010.
KCI, Prevena™ Incision Management System Clinician Guide, Jan. 2010.

* cited by examiner

*Primary Examiner* — Darlington Ly
(74) *Attorney, Agent, or Firm* — Knobbe, Martens, Olson & Bear, LLP

(57) CLAIM

The ornamental design for a medical dressing, as shown and described.

DESCRIPTION

[FIG. 1 is a perspective top view of one embodiment of a medical dressing.]
[FIG. 2 is another perspective top view of the medical dressing of FIG. 1.]
[FIG. 3 is a top plan view of the medical dressing of FIG. 1.]
[FIG. 4 is a bottom view of the medical dressing of FIG. 1.]
[FIG. 5 is a far side view of the medical dressing of FIG. 1.]
[FIG. 6 is a near side view of the medical dressing of FIG. 1.]
[FIG. 7 is a front view of the medical dressing of FIG. 1; and,]
[FIG. 8 is a rear view of the medical dressing of FIG. 1.]
*FIG. 9 is a top, right-side, and front perspective view of a medical dressing.*
*FIG. 10 is a top, right-side, and rear perspective top view of the medical dressing of FIG. 9.*
*FIG. 11 is a top plan view of the medical dressing of FIG. 9.*
*FIG. 12 is a bottom plan view of the medical dressing of FIG. 9.*
*FIG. 13 is a left side elevation view of the medical dressing of FIG. 9.*
*FIG. 14 is a right side elevation view of the medical dressing of FIG. 9.*
*FIG. 15 is a front elevation view of the medical dressing of FIG. 9; and,*
*FIG. 16 is a rear elevation view of the medical dressing of FIG. 9.*
*The broken lines in the drawings illustrate portions of the medical dressing that form no part of the claimed design.*

1 Claim, 16 Drawing Sheets

Figure 1:
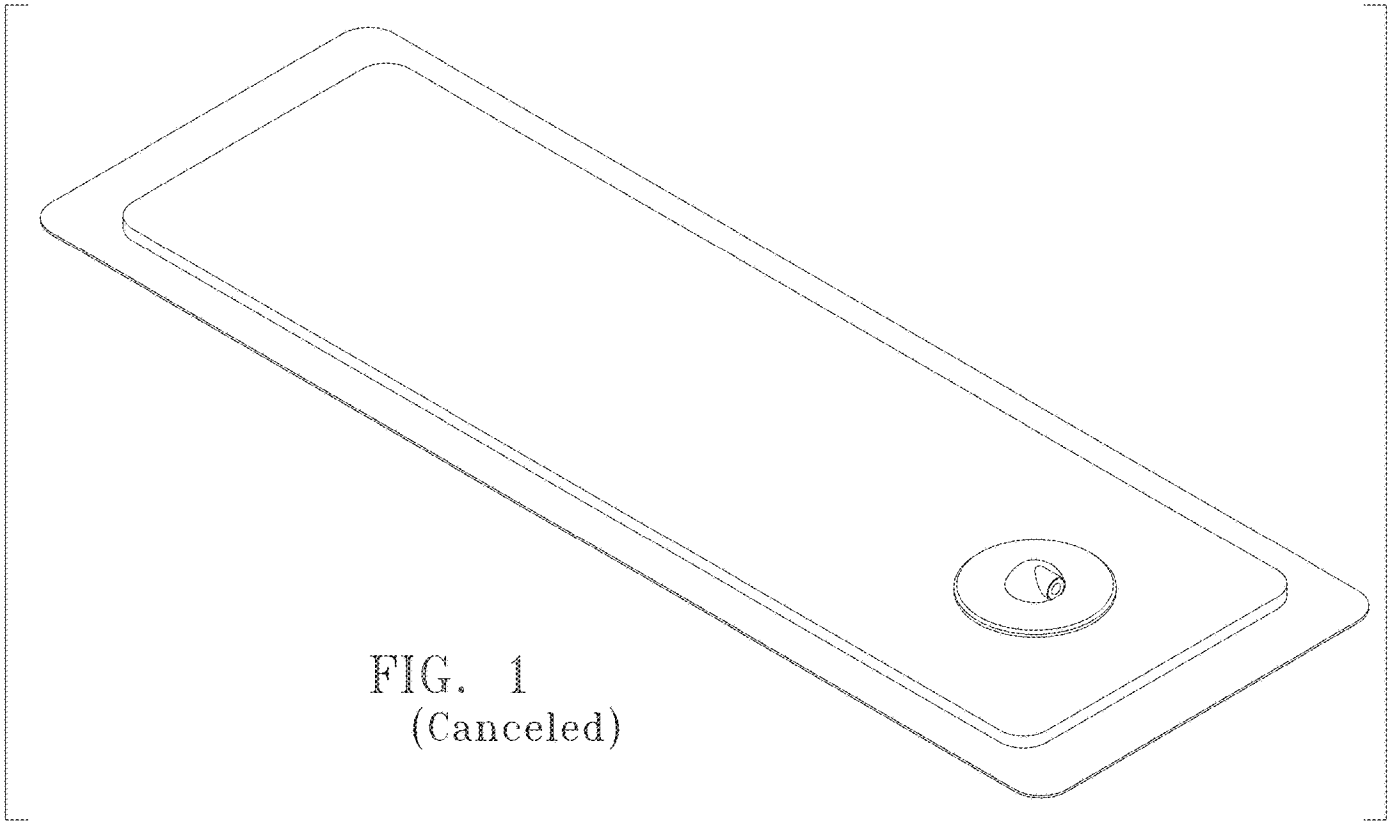
Figure 2:
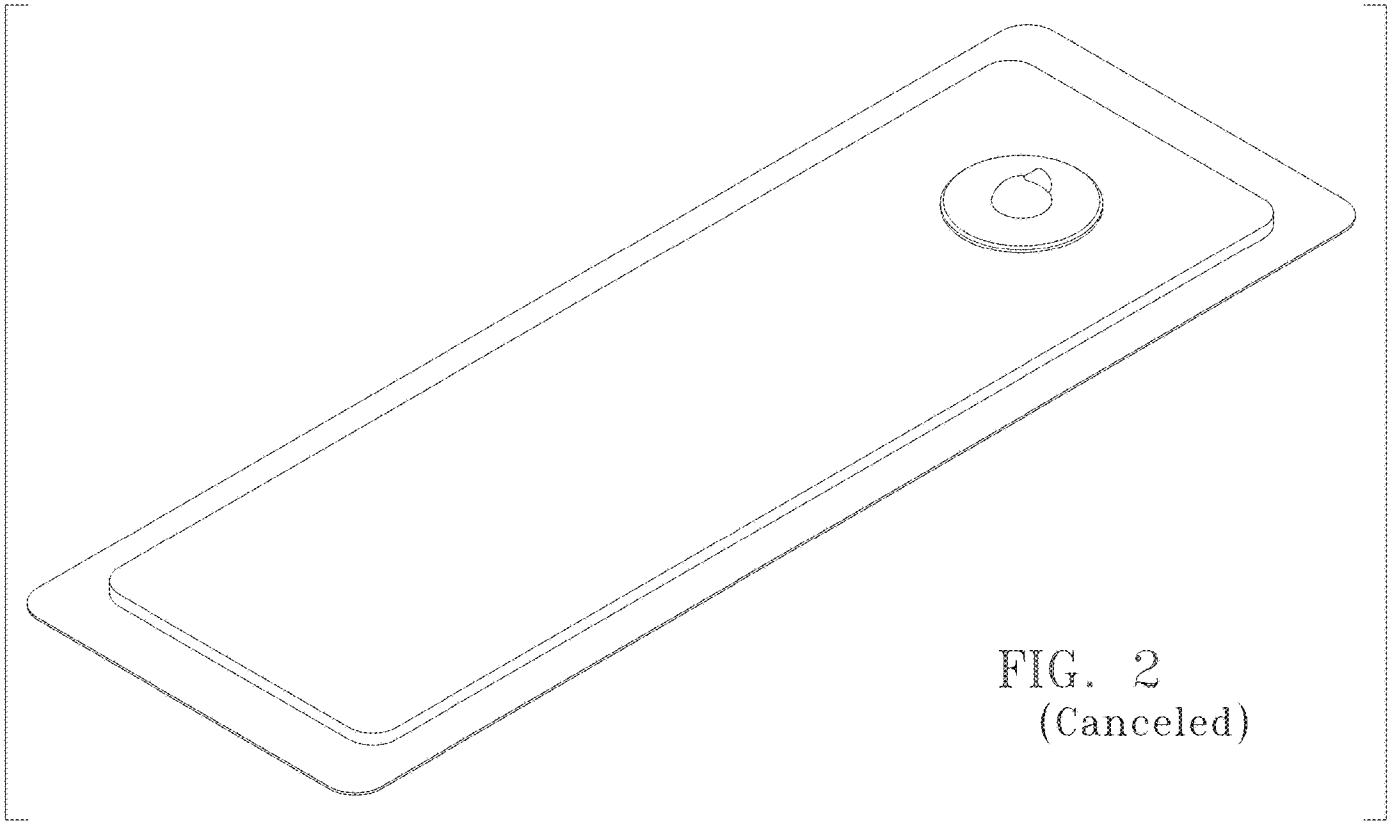
Figure 3:
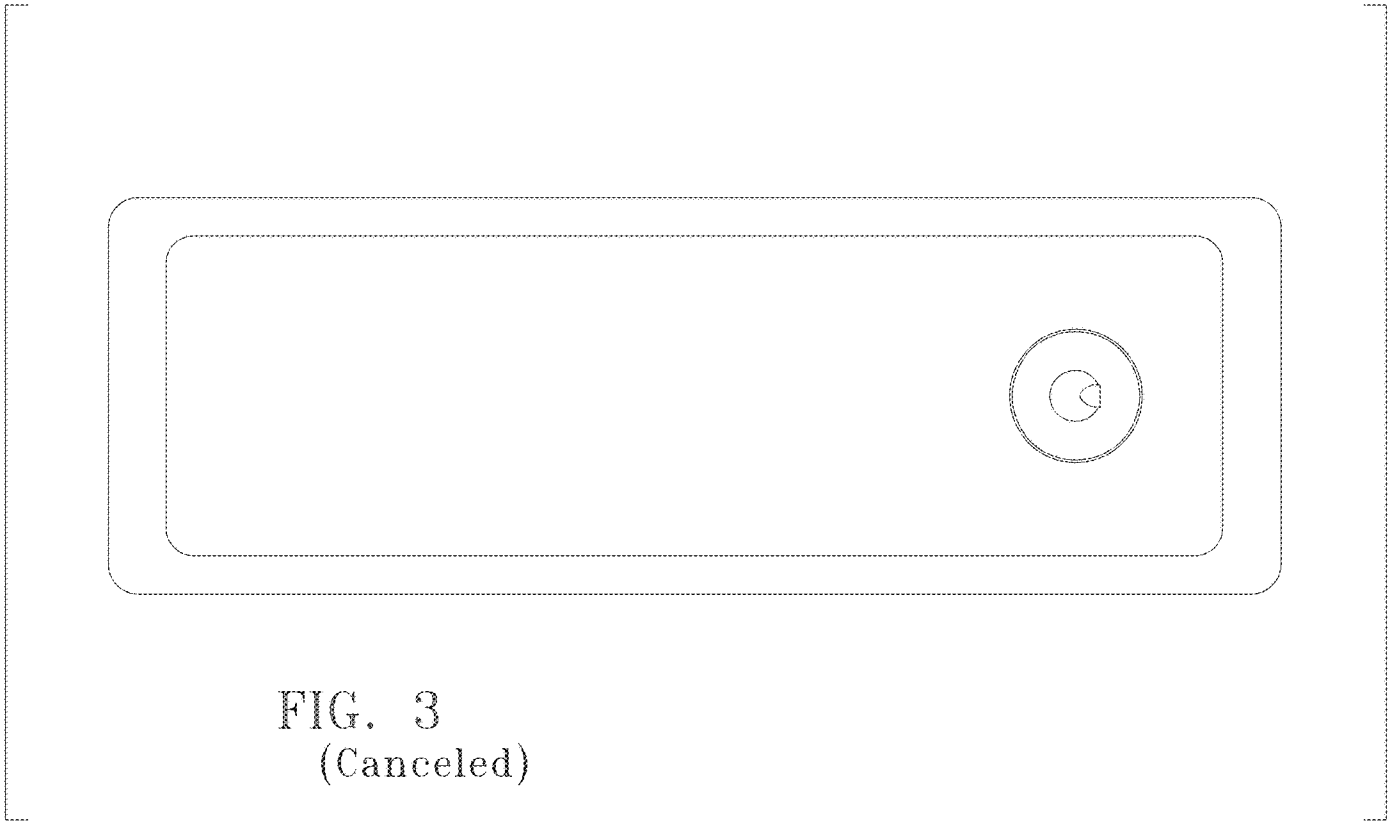
Figure 4:
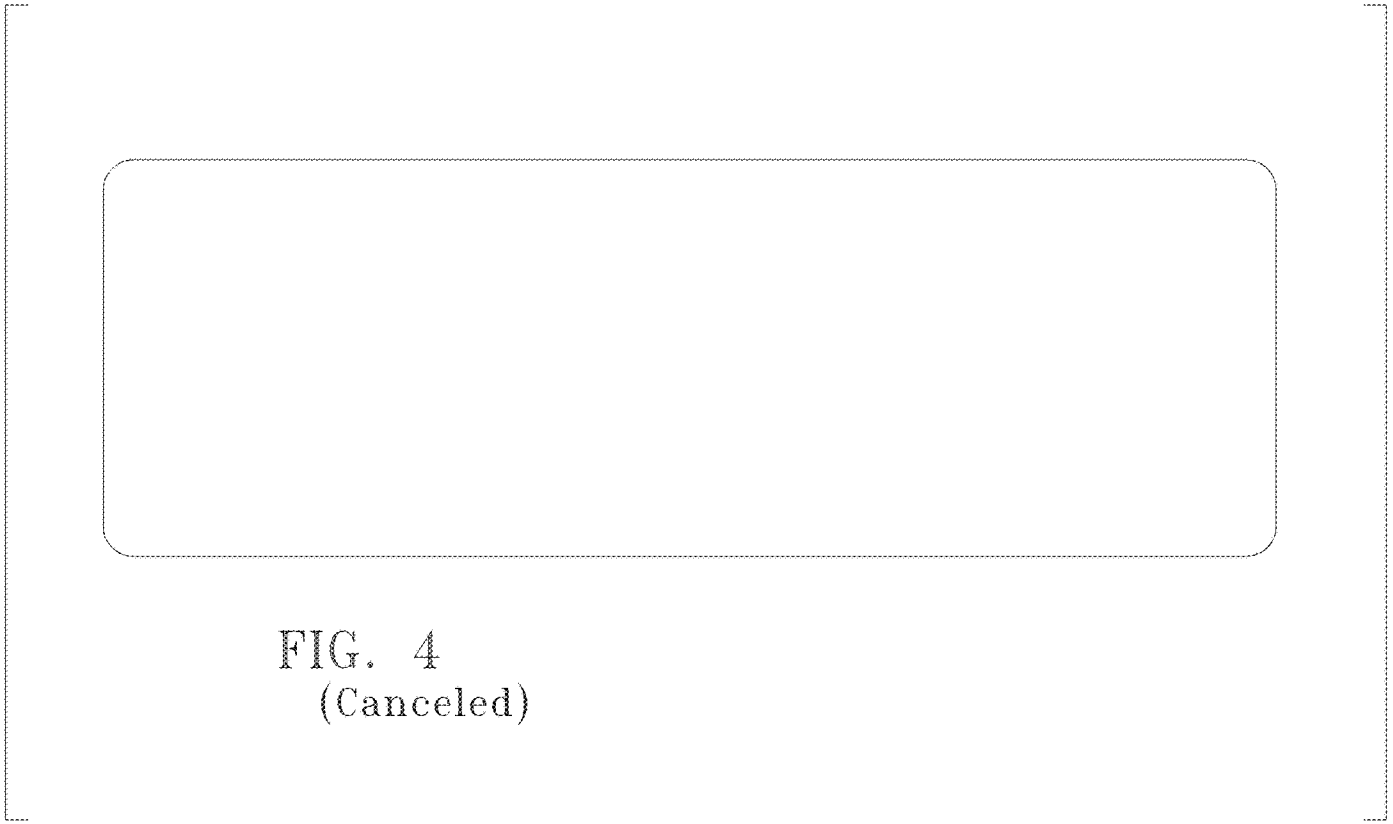
Figure 5:
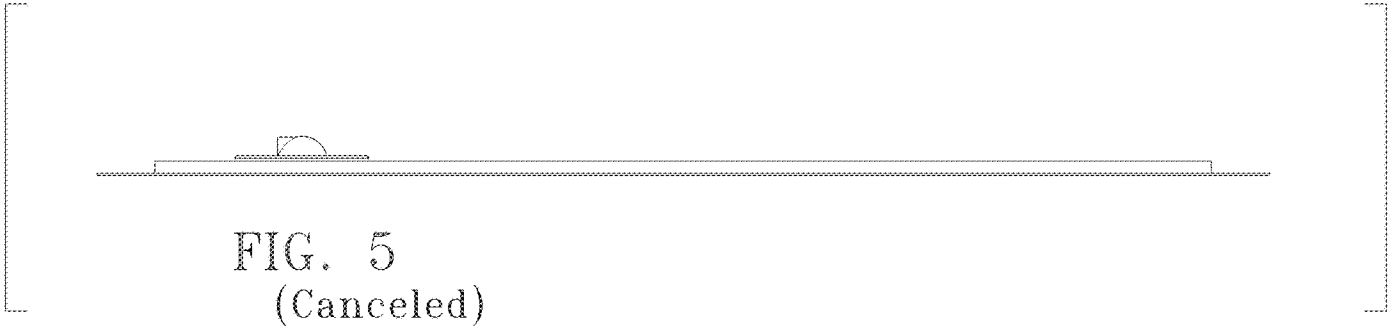
Figure 6:
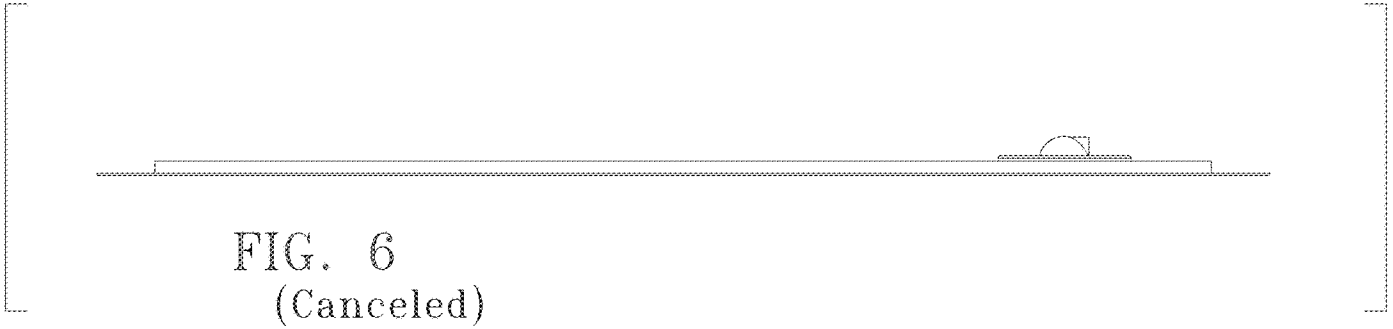
Figure 7:
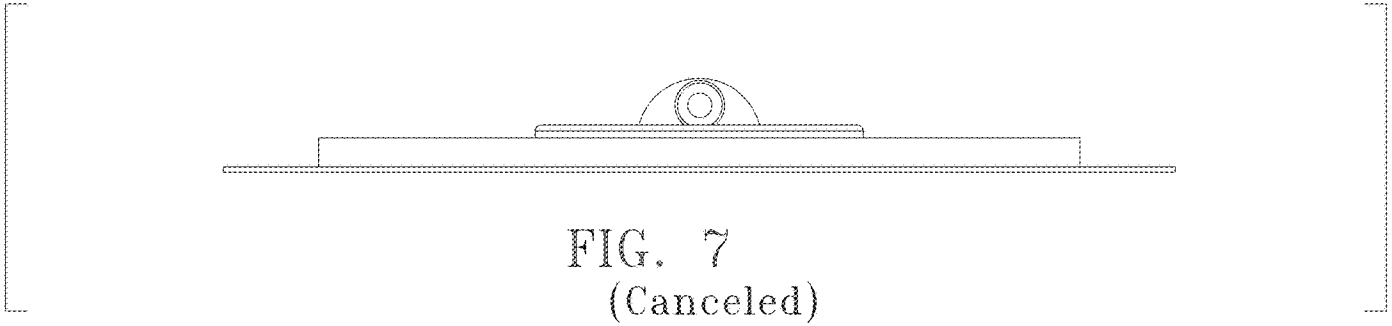
Figure 8:
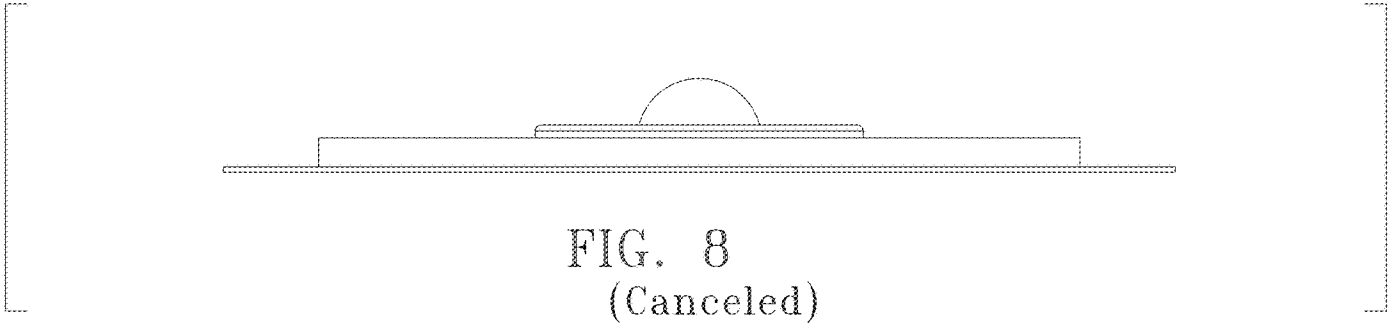

Matter enclosed in heavy brackets [ ] appears in the original patent but forms no part of this reissue; matter printed in italics indicates the additions made by reissue.

(Canceled)

(Canceled)

(Canceled)

(Canceled)

(Canceled)

(Canceled)

(Canceled)

(Canceled)

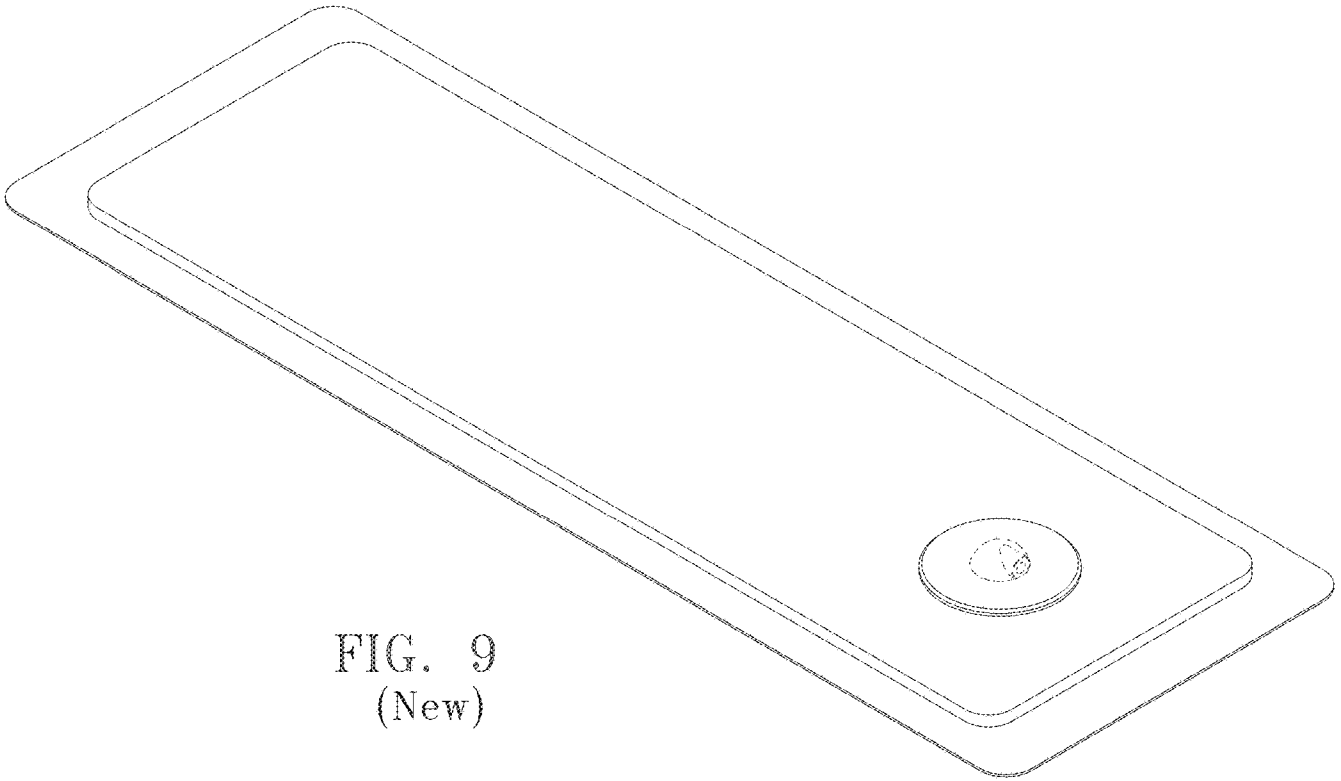
FIG. 9
(New)

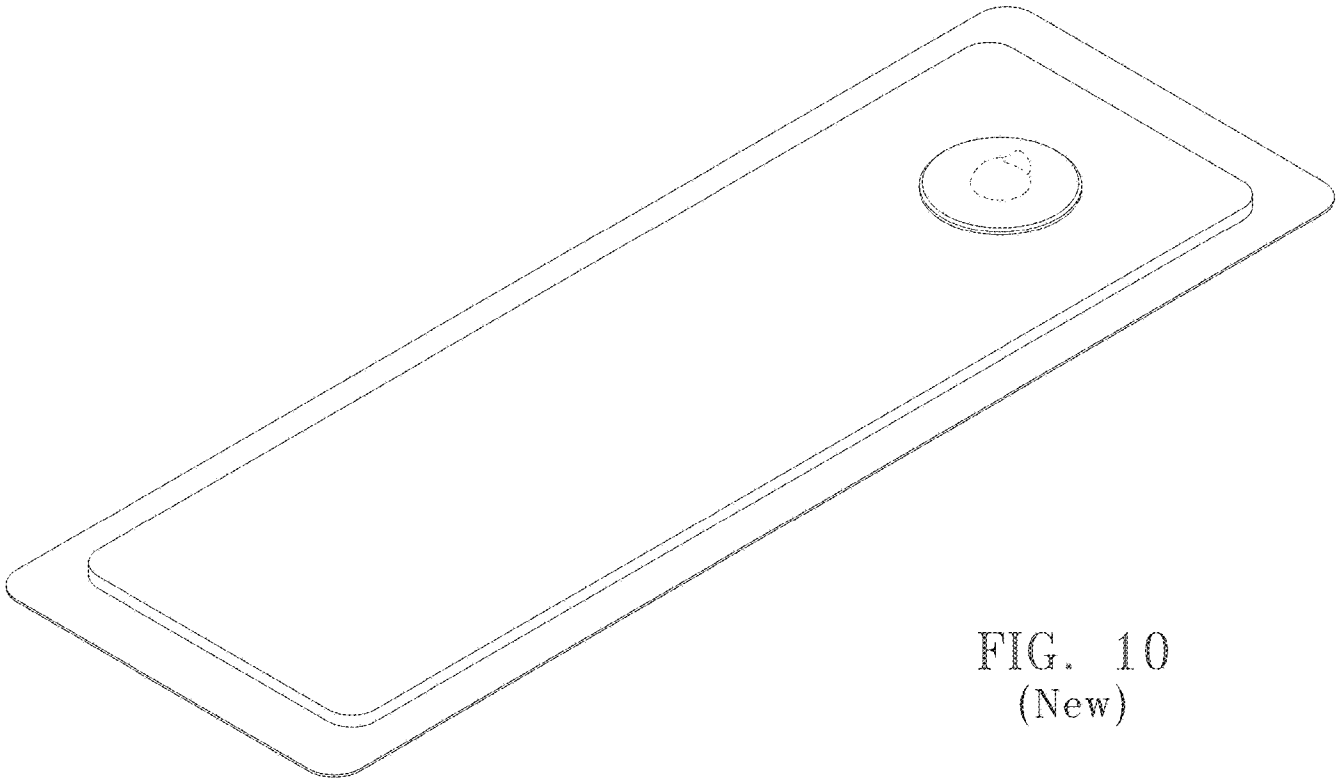
FIG. 10
(New)

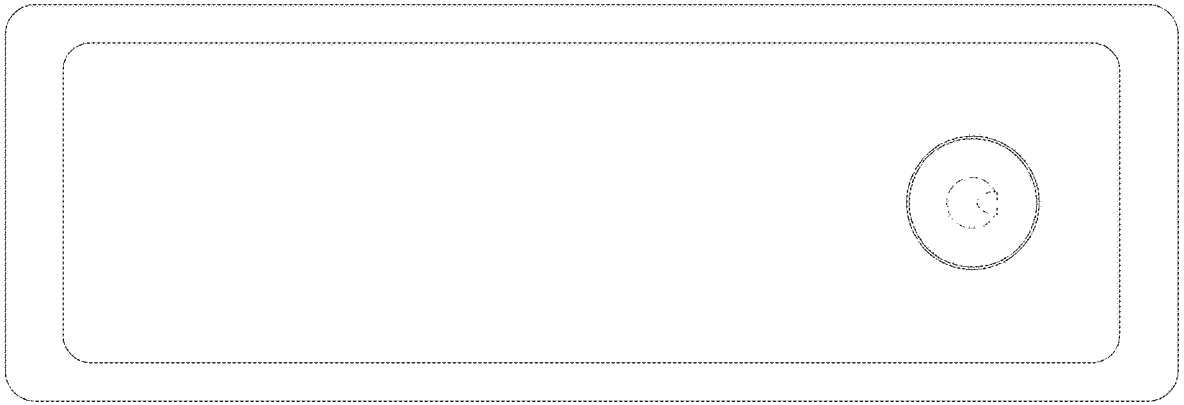
FIG. 11
(New)

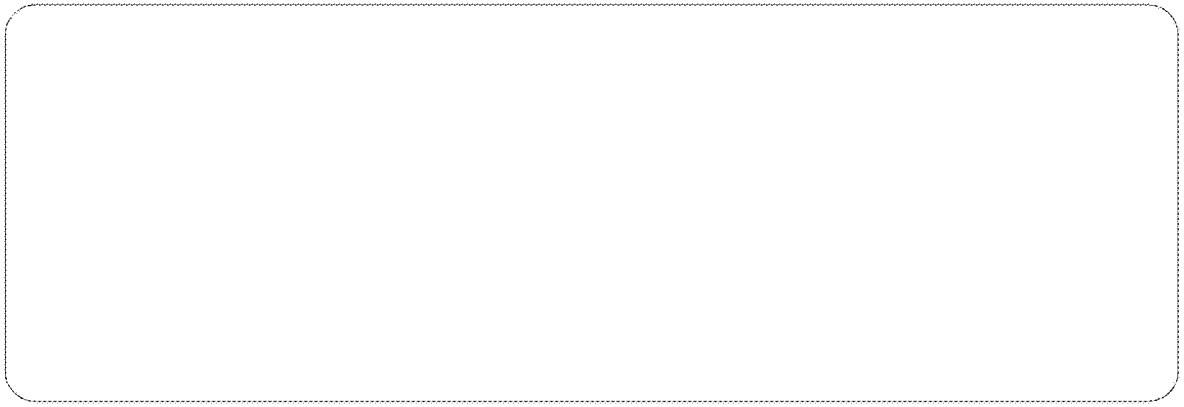
FIG. 12
(New)

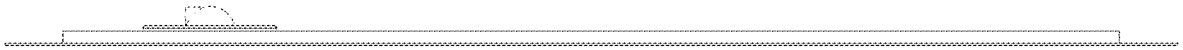
FIG. 13
(New)

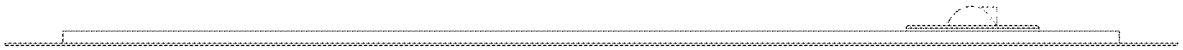
FIG. 14
(New)

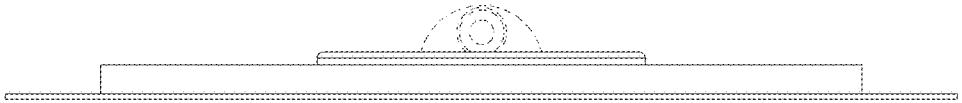
FIG. 15
(New)

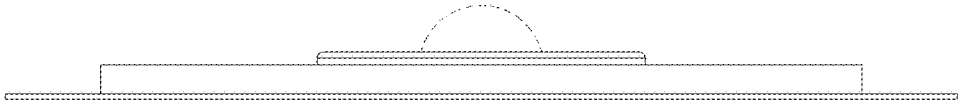
FIG. 16
(New)